United States Patent
Veggian et al.

(10) Patent No.: US 10,525,926 B2
(45) Date of Patent: Jan. 7, 2020

(54) VEHICLE SEAT SIDE AIR BAG ASSEMBLY

(71) Applicant: Ford Global Technologies, LLC, Dearborn, MI (US)

(72) Inventors: Eric D. Veggian, Superior Twp., MI (US); Brian Robert Spahn, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 84 days.

(21) Appl. No.: 15/864,746

(22) Filed: Jan. 8, 2018

(65) Prior Publication Data

US 2019/0210551 A1 Jul. 11, 2019

(51) Int. Cl.
*B60R 21/215* (2011.01)
*B60R 21/207* (2006.01)
*B60R 21/2165* (2011.01)
*B60N 2/00* (2006.01)

(52) U.S. Cl.
CPC .......... *B60R 21/215* (2013.01); *B60R 21/207* (2013.01); *B60R 21/2165* (2013.01); *B60N 2/00* (2013.01)

(58) Field of Classification Search
CPC ............................ B60R 21/207; B60R 21/215
See application file for complete search history.

(56) References Cited

U.S. PATENT DOCUMENTS

| | | | |
|---|---|---|---|
| 7,328,140 B2 | 2/2008 | Kong | |
| 7,377,542 B2* | 5/2008 | Tracht | B60R 21/207 280/728.2 |
| 7,452,030 B2* | 11/2008 | Yoshikawa | B60N 2/4221 280/730.1 |
| 8,820,780 B2 | 9/2014 | Thomas | |
| 9,694,778 B1* | 7/2017 | Veggian | B60R 21/207 |
| 2006/0113767 A1* | 6/2006 | Tracht | B60R 21/207 280/730.2 |
| 2006/0113769 A1* | 6/2006 | Tracht | B60R 21/207 280/730.2 |
| 2006/0255572 A1* | 11/2006 | Svenbrandt | B60R 21/207 280/730.2 |
| 2007/0235993 A1* | 10/2007 | Yoshikawa | B60N 2/4221 280/730.1 |
| 2016/0009248 A1* | 1/2016 | Tanabe | B60R 21/276 280/728.2 |

FOREIGN PATENT DOCUMENTS

DE 102010019927 A1 11/2011
DE 102012221204 A1 5/2014

* cited by examiner

*Primary Examiner* — Faye M Fleming
(74) *Attorney, Agent, or Firm* — Frank A. MacKenzie; Bejin Bieneman PLC

(57) ABSTRACT

A seat assembly includes a base. The seat assembly includes an air bag supported by the base. The seat assembly includes a cover adjacent the base. The seat assembly includes a first plurality of ribs extending transversely from the cover and toward the base. The seat assembly includes a second plurality of ribs extending transversely from the base and toward the cover.

19 Claims, 8 Drawing Sheets

VEHICLE SEAT SIDE AIR BAG ASSEMBLY

BACKGROUND

Vehicles may include a variety of air bag assemblies deployable during vehicle impacts to absorb energy from occupants of the vehicles during the impact. The air bag assembly may include an air bag and an inflator in communication with an inflation chamber of the air bag. The inflator may inflate the air bag with an inflation medium to inflate the air bag from an uninflated position to an inflated position. The vehicle may include an impact sensing system in communication with the air bag assembly. The impact sensing system may sense a vehicle impact and instruct the inflator to inflate the air bag when a vehicle impact is sensed.

A frame of a vehicle seat may support a seat side air bag assembly. In the uninflated position, a cover for the vehicle seat may conceal the air bag assembly. In the inflated position, the seat side air bag may deploy through the cover. The performance of seat side air bags is dependent on inflation speed. There remains an opportunity to design a vehicle seat side air bag assembly to help facilitate timely and proper deployment of the air bag.

DETAILED DESCRIPTION

Figure 1:
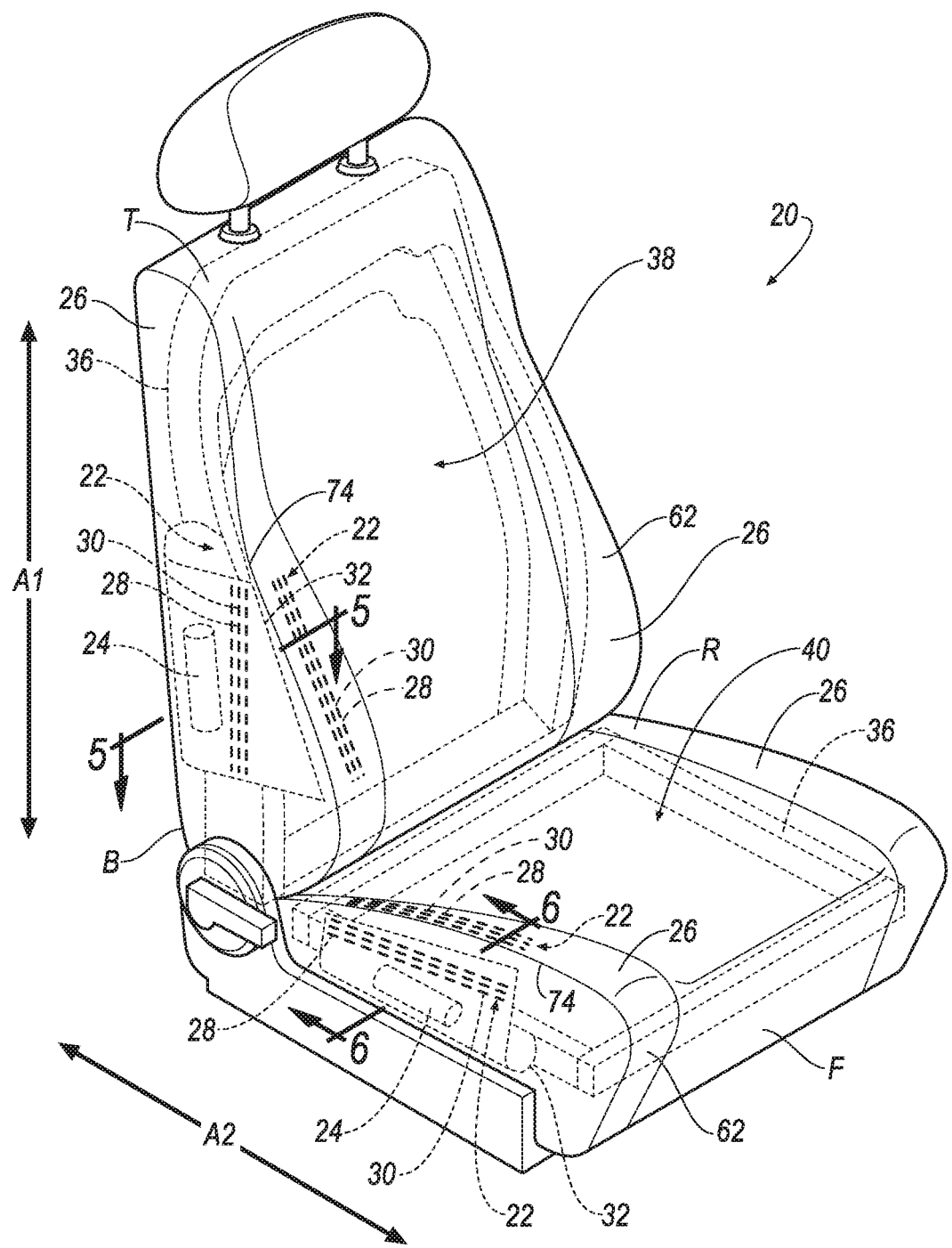
FIG. 1 is a perspective view of a vehicle seat showing a frame and seat side air bag assemblies in hidden lines.

A seat assembly includes a base. The seat assembly includes an air bag supported by the base. The seat assembly includes a cover adjacent the base. The seat assembly includes a first plurality of ribs extending transversely from the cover and toward the base. The seat assembly includes a second plurality of ribs extending transversely from the base and toward the cover.

The base may include a chute, and the second plurality of ribs may extend transversely from the chute.

The chute may define a cavity having an open end, and the first plurality of ribs may extend from the cover toward the open end and the second plurality of ribs may extend from the base away from the open end.

The chute and the second plurality of ribs may be monolithic.

The chute may include an outer surface, and the second plurality of ribs may extend transversely from the outer surface.

The base may include a cushion, and the second plurality of ribs may extend transversely from the cushion.

The seat assembly may include a seat back defining a vertical axis, and the first plurality of ribs and the second plurality of ribs may be elongated along the vertical axis.

The seat assembly may include a seat bottom defining a longitudinal axis, and the first plurality of ribs and the second plurality of ribs may be elongated along the longitudinal axis.

The air bag may be inflatable in an inflation direction to an inflated position, and the first plurality of ribs and the second plurality of ribs may be elongated generally perpendicular to the inflation direction.

The air bag may be inflatable in an inflation direction to an inflated position, and the first plurality of ribs may extend from the cover toward the inflation direction and the second plurality of ribs may extend from the base away from the inflation direction.

The cover may include a tear seam, and the first plurality of ribs and the second plurality of ribs may be elongated generally parallel to the tear seam.

The cover may include a tear seam, and the first plurality of ribs may extend from the cover toward the tear seam and the second plurality of ribs may extend from the base away from the tear seam.

The seat assembly may include a third plurality of ribs extending transversely from the cover and toward the base, and the cover may include a tear seam between the first plurality of ribs and the third plurality of ribs.

The seat assembly may include a third plurality of ribs extending transversely from the cover and toward the base, and may include a fourth plurality of ribs extending transversely from the base and toward the cover, and the air bag may be inflatable to an inflated position that is between the first plurality of ribs and the third plurality of ribs and between the second plurality of ribs and the fourth plurality of ribs.

The first plurality of ribs and the second plurality of ribs may extend in opposite directions.

The cover may include an inner surface, and the first plurality of ribs may extend from the inner surface.

The first plurality of ribs and the second plurality of ribs may be elongated parallel to each other.

With reference to the Figures, wherein like numerals indicate like parts throughout the several views, a seat 20 for a vehicle (not shown) includes a base 22. The seat 20 includes one or more air bags 24 supported by the base 22. The seat 20 includes a cover 26 adjacent the base 22. The seat 20 includes a plurality of ribs 28, which may be referred to as a first plurality of ribs, extending transversely from the cover 26 and toward the base 22. The seat 20 includes another plurality of ribs 30, which may be referred to as a second plurality of ribs, extending transversely from the base 22 and toward the cover 26. The adjectives "first" and "second" are used throughout this document as identifiers and are not intended to signify importance or order.

The plurality of ribs 28 that extend from the cover 26 engage the plurality of ribs 30 that extend from base 22, e.g., upon inflation of the air bag 24, making the cover 26 less likely to move, stretch, or otherwise delay the air bag 24 from deploying to an inflated position. In addition, the pluralities of ribs 28, 30 allow for a more flexible and cost-effective assembly process of the seat 20. For example, during the assembly process, the cover 26 may be rolled down to cover a frame 36, a chute 32, a cushion 34, etc., of the seat 20. As the cover 26 is rolled down, the pluralities of ribs 28, 30 may engage with each other. Secondary processes to attach the cover 26 to the chute 32, the cushion 34, etc., may thereby be avoided.

Figure 5:
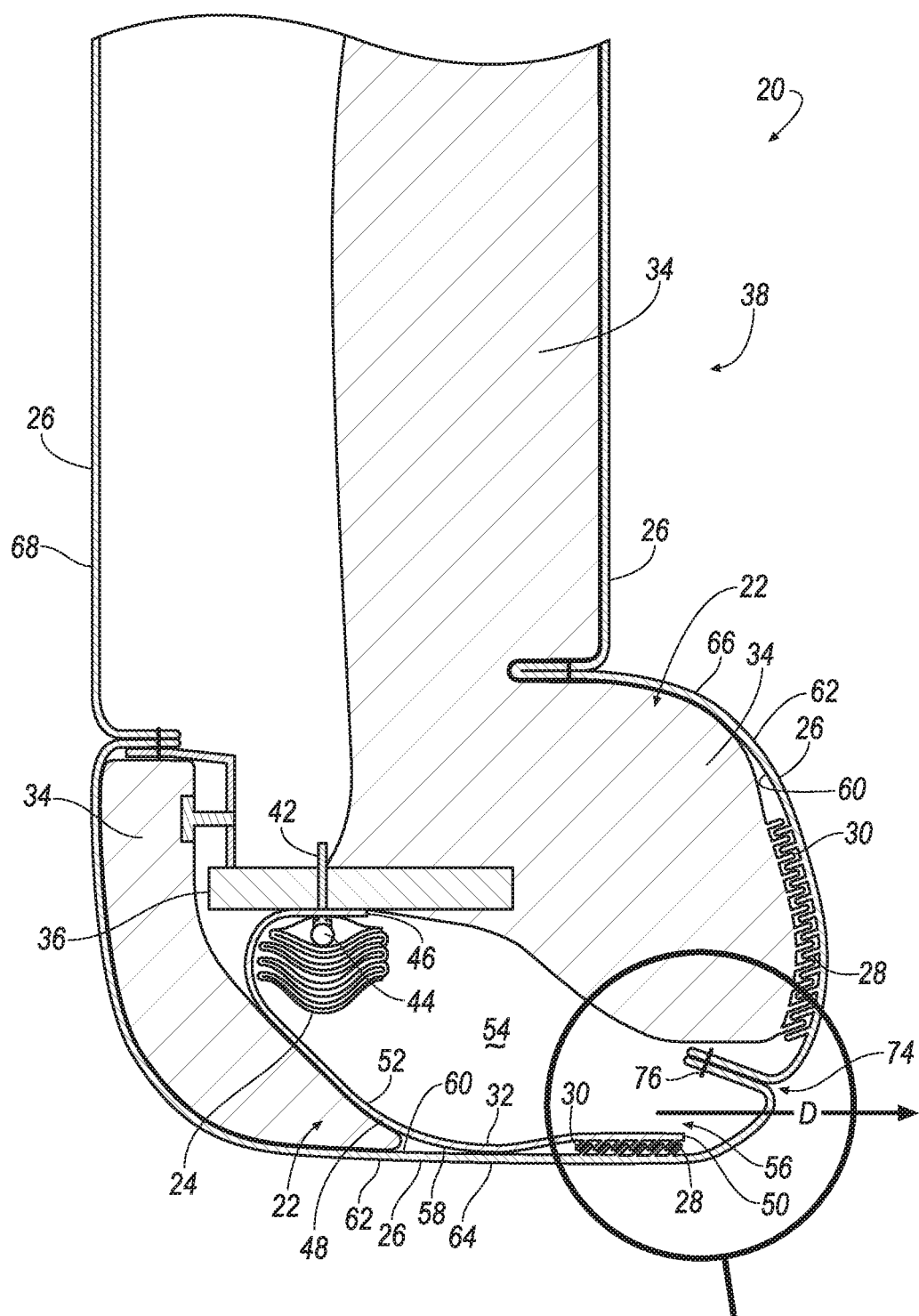
FIG. 5 is a section view of the vehicle seat taken in the direction of arrows 5-5 in FIG. 1.
Figure 6:
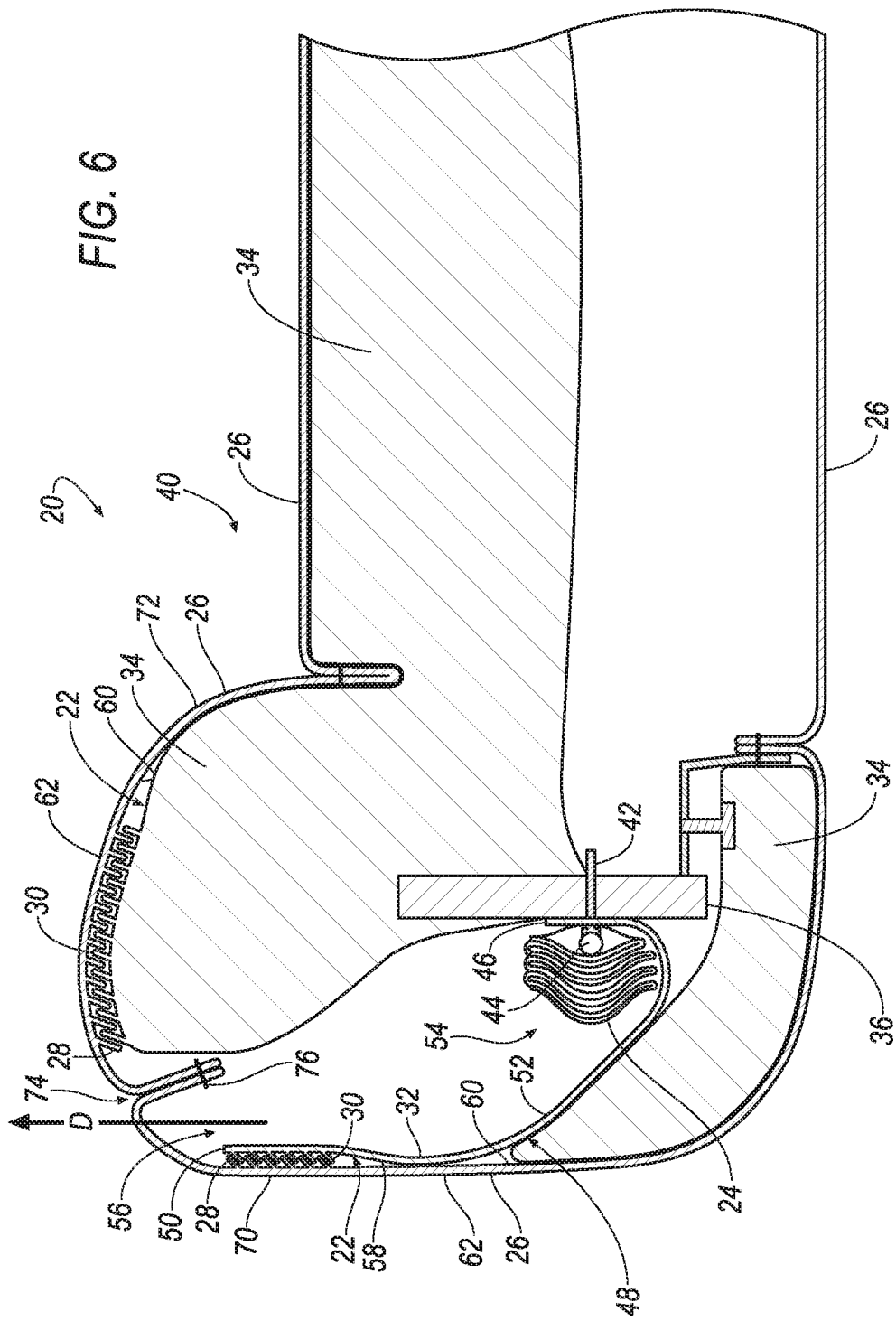
FIG. 6 is a section view of the vehicle seat taken in the direction of arrows 6-6 in FIG. 1.

The base 22 provides interior structure to the seat 20. The base 22 may support the cover 26. The base 22 may abut the cover 26. The base 22 may be metal, plastic, or any other suitable material. The base 22 may be a single component of the seat 20, or a combination of components of the seat 20. For example, the base 22 may include the chute 32. Specifically, an outer surface 58 of the chute 32 may support the cover 26, as shown in FIGS. 5 and 6. As another example, the base 22 may include the cushion 34. Specifically, an outer surface of the cushion 24 may support the cover 26, as shown in FIGS. 5 and 6. The base 22 may include a combination of the chute 32, the cushion 34, and/or any other interior component of the seat 20.

The seat 20 shown in FIGS. 1-3 and 5-6 is a bucket seat, but alternatively the seat 20 may be a bench seat or another type of seat.

The seat 20 may include a seat back 38 and a seat bottom 40. The seat back 38 may be supported by the seat bottom 40 and may be stationary or movable relative to the seat bottom 40. The seat back 38 defines a vertical axis A1. The vertical axis A1 is elongated between a top "T" and a bottom "B" of the seat back 38. The seat bottom 40 defines a longitudinal axis A2. The longitudinal axis A2 is elongated between a front "F" and a rear "R" of the seat bottom 40. The seat back 38 and the seat bottom 40 are supported such that the bottom "B" of the seat back 38 is adjacent the rear "R" of the seat bottom 40. The vertical axis A1 and the longitudinal axis A2 may or may not be perpendicular, e.g., depending on a position of the seat back 38 relative to the seat bottom 40.

The seat bottom 40 and/or the seat back 38 may include the frame 36, the cover 26, etc. The frame 36 may include tubes, beams, etc. The frame 36 may be formed of any suitable plastic material, e.g., carbon fiber reinforced plastic (CFRP), glass fiber-reinforced semi-finished thermoplastic composite (organosheet), etc. As another example, some or all components of the frame 36 may be formed of a suitable metal, e.g., steel, aluminum, etc. The frame 36 supports the cover 26, the chute 32, the air bag 24, etc. The frame 36 may also be formed from a combination of materials. The cushion 34 may also be mounted on the frame 36, e.g., between the frame 36 and the cover 26. The cushion 34 may be foam and/or other any other suitable cushioning material.

The chute 32 may be mounted to the frame 36. The chute 32 may define one or more holes (not shown) that align with the one or more holes in the frame 36. Fasteners 42, shown in FIGS. 4-6, may extend through the holes of the chute 32 into the one or more aligned holes in the frame 36 to mount the chute 32 to the frame 36. For example, the fasteners 42 may be fixed to an inflator 44 that is attached to the air bag 24. The fasteners 42 may include bolts, clips, screws, Christmas tree fasteners and the like. The fasteners 42 may be formed from metal, e.g., steel, aluminum, etc., and other suitable materials.

Alternatively, fasteners 42 may be monolithic with the chute 32, i.e., a single piece of material with no seams, joints, fasteners, welds, or adhesives holding the fasteners 42 and chute 32 together. As another example, the fasteners 42 may be formed separately from the chute 32 and subsequently attached to the chute 32. Fasteners 42 may be proximate a first end 46 of the chute 32. The fasteners 42 may extend from the chute 32 through one or more aligned holes (not shown) in the frame 36 to mount the chute 32 to the frame 36.

Figure 4:
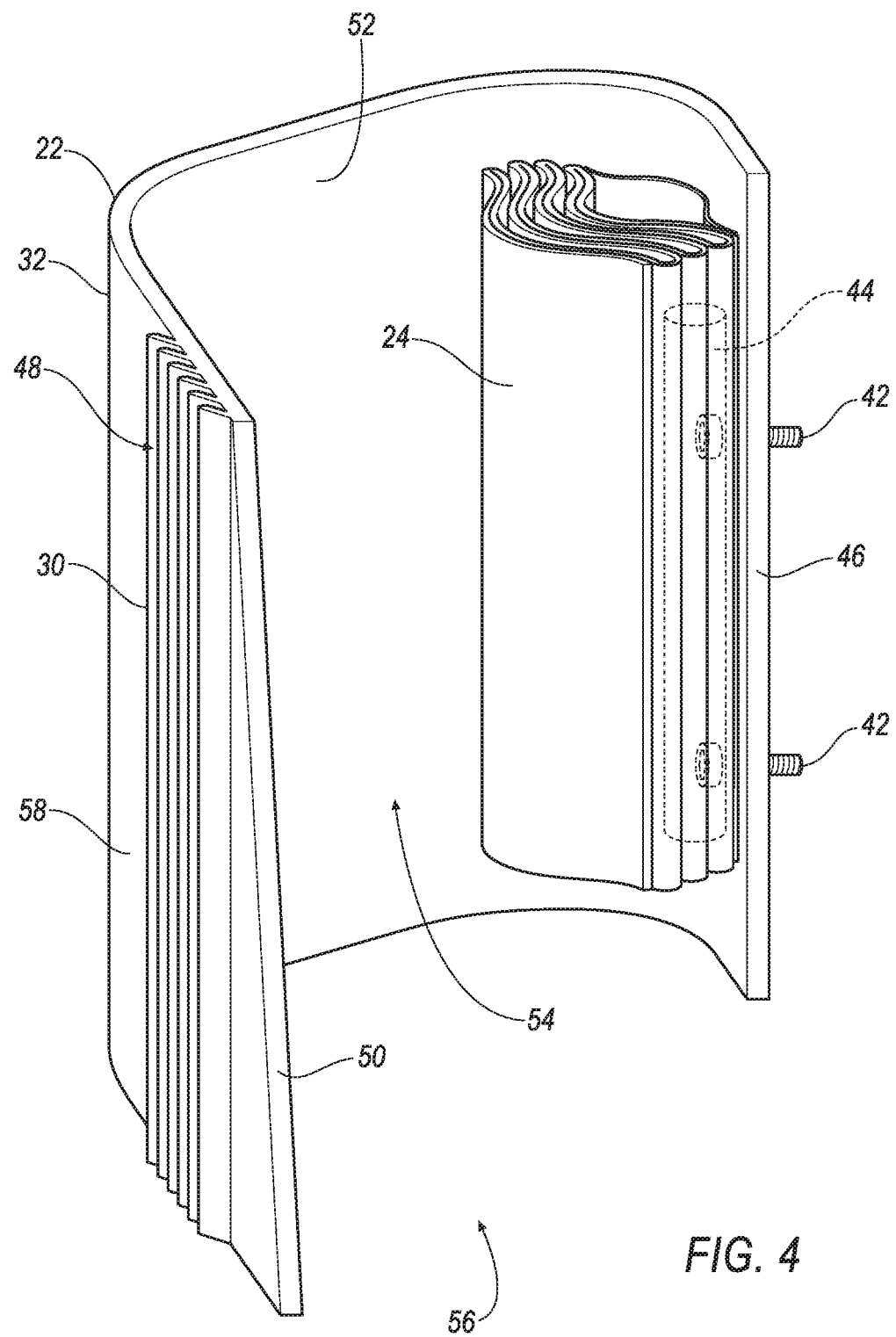
FIG. 4 is a perspective view of the seat side air bag assembly.

The chute 32 may extend from the frame 36 to the cover 26. The chute 32 may be made from fabric, plastic, metal, fiberglass or other suitable materials. The chute 32 may be mounted to the frame 36 proximate the first end 46 of the chute 32. A flange 48 of the chute 32 extends from the first end 46 to a second end 50, as shown in FIG. 4. The chute 32 may have an inner surface 52 that defines a cavity 54 between the first end 46 and the second end 50. The cavity 54 may have an open end 56. The chute 32 may include the outer surface 58, e.g., opposite the inner surface 52.

Figure 2:
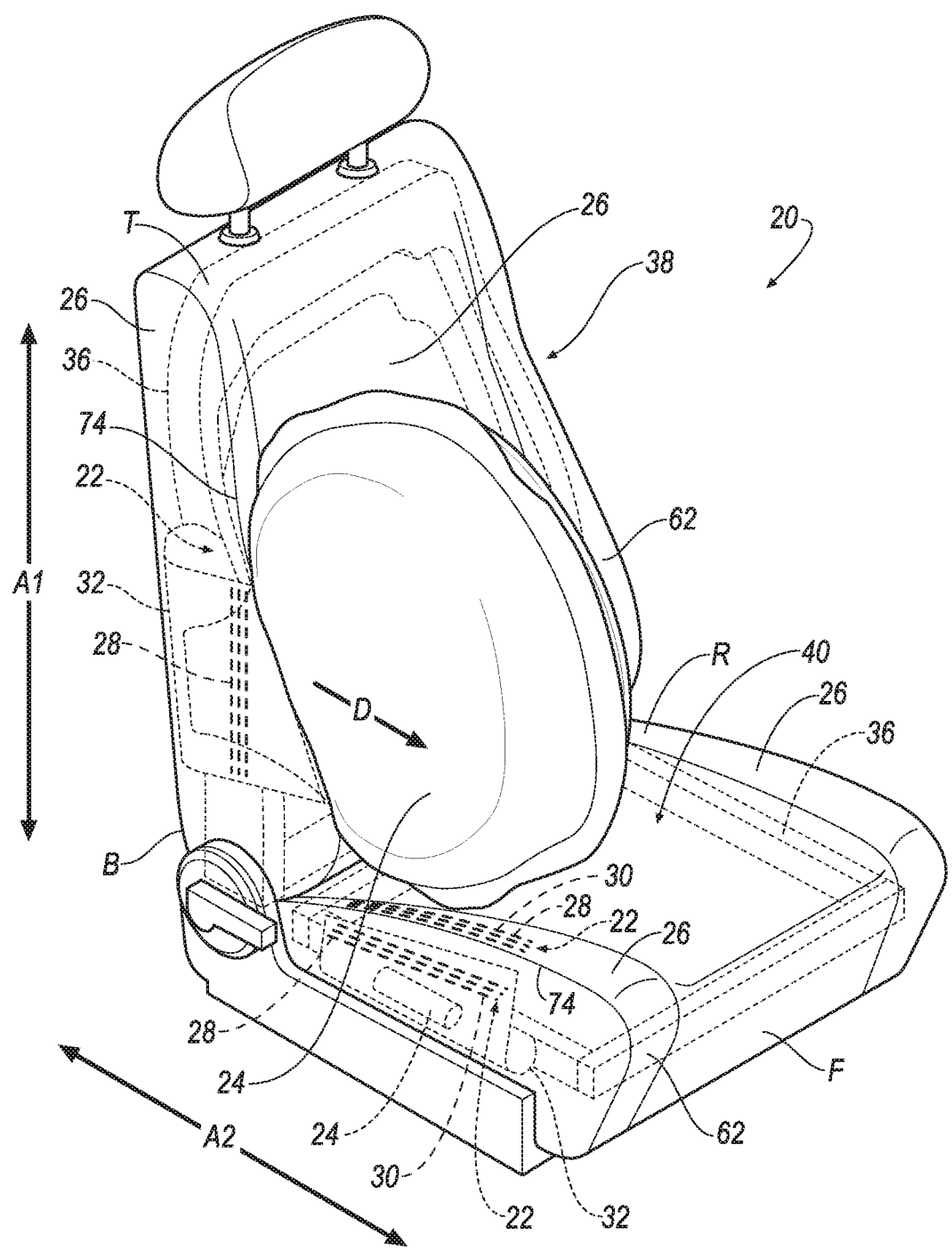
FIG. 2 is a perspective view of the vehicle seat shown in FIG. 1, with one of the air bags deployed and in an inflated position.
Figure 3:
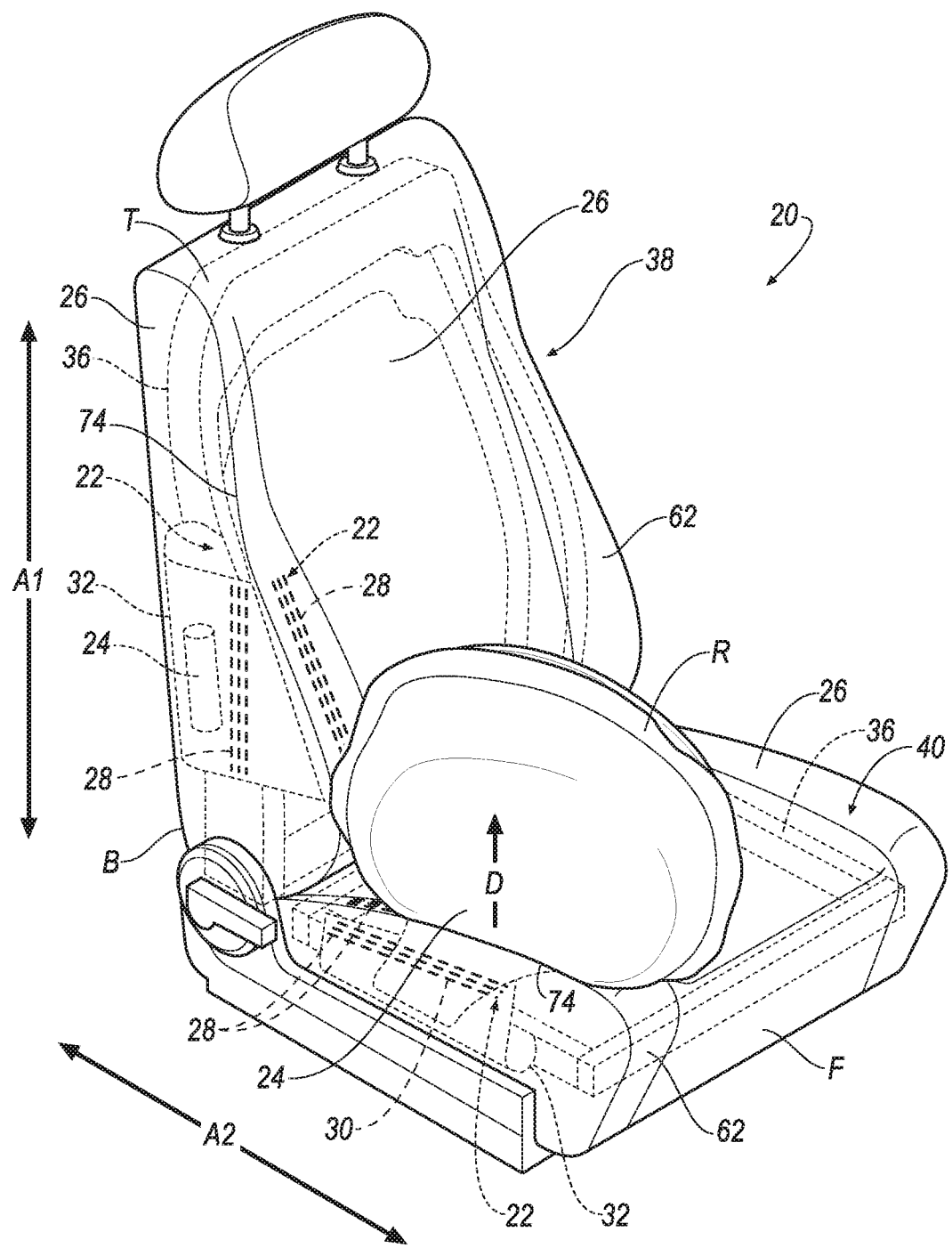
FIG. 3 is a perspective view of the vehicle seat shown in FIG. 1, with another of air bags deployed and in an inflated position.

The air bag 24 is inflatable from an uninflated position, shown in FIGS. 1-6, to the inflated position, shown in FIGS. 2 and 3. The air bag 24 may be formed of any suitable type of material, e.g., from a woven polymer. For example, the air bag 24 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

The air bag 24 is supported by the base 22. For example, the air bag 24 may be fixed to the chute 32, e.g., in any suitable manner. For example, the air bag 24 may be attached to the inflator 44. The inflator 44 may include threaded fasteners 42 that extend through holes (not shown) in the chute 32 into the one or more aligned holes in the frame 36 to mount the air bag 24 to the chute 32 and the chute 32 to the frame 36.

As shown in FIGS. 5 and 6, the chute 32 extends between the air bag 24 and the cover 26 when the air bag 24 is in the uninflated position. The air bag 24 may, for example, be disposed between the first end 46 and the flange 48 of the chute 32.

Upon deployment, the air bag 24 inflates past the chute 32, e.g., through the open end 56 of the cavity 54, and ruptures through the cover 26 to the inflated position. The chute 32 guides the inflation of the air bag 24 from the uninflated position to the inflated position to define an inflation direction D. For example, the inflation direction D may extend from inside to outside of the cavity 54 through the open end 56.

The air bag 24 in the inflated position may be between the pluralities of ribs 28, 30. For example, the plurality of ribs 30 that extend from the chute 32 and engage the plurality of ribs 28 that extend from the cover 26 may be on one side of the air bag 24 in the inflated position, and the plurality of ribs 30 that extend from the cushion 34 and engage the plurality of ribs 28 that extend from the cover 26 may be on an opposite side of the air bag 24 in the inflated position. To put it another way, the air bag 24 in the inflated position may be between the plurality of ribs 30 that extend from the chute 32 to engage the plurality of ribs 28 that extend from the cover 26 and the plurality of ribs 30 that extend from the cushion 34 to engage the plurality of ribs 28 that extend from the cover 26.

The inflator 44 is in fluid communication with an inflation chamber (not shown) of the air bag 24. The inflator 44 expands the air bag 24 with an inflation medium, such as a gas, to move the air bag 24 from the uninflated position to the inflated position. The inflator 44 may be, for example, a pyrotechnic inflator that uses a chemical reaction to drive the inflation medium into the air bag 24. Alternatively, the inflator 44 may be, for example, a cold-gas inflator that, when activated, ignites a pyrotechnic charge that creates an opening for releasing the pressurized inflation medium to the air bag 24 via a fill tube (not shown). Alternatively, the inflator 44 may be of any suitable type, for example, a hybrid inflator.

The cover 26 may cover the chute 32, the frame 36, the air bag 24, the cushion 34, etc. The cover 26 includes an inner surface 60 and an outer surface 62 opposite the inner surface 60, shown in FIGS. 5 and 6. The cover 26 may be adjacent the base 22. For example, the inner surface 60 of the cover 26 may be adjacent the chute 32, the cushion 34, etc. The cover 26 may be formed from any suitable material, including fabrics such as cloth, vinyl, leather, etc., as well as combinations thereof.

The cover 26 may be formed from one or more panels of material. For example, with reference to FIG. 5, the cover 26 of the seat back 38 may include a side panel 64, a front panel 66 and a back panel 68. For example, with reference to FIG. 6, the cover 26 of the seat bottom 40 may include a side panel 70, a top panel 72, etc. The side panel 64 and the front panel 66, the side panel 70 and the top panel 72, etc., may be joined together by one or more tear seams 74. The tear seam 74 may be joined together with one or more break away stitches 76, or other known structures, materials and methods.

The tear seam 74 is rupturable relative to the panels 64, 66, 68, 70, 72. In other words, the tear seam 74 is designed to rupture in response to forces applied to the cover 26 by the air bag 24 during deployment of the air bag 24 from the uninflated position to the inflated position. For example, the material type, size, and/or shape of the tear seam 74 may be designed to rupture in response to the inflation of the air bag 24. As the tear seam 74 ruptures, the air bag 24 extends through the tear seam 74 and outward from the cover 26.

The tear seam 74 may be between the pluralities of ribs 28 extending from the cover 26. To put it another way, one plurality of ribs 28 extending from the cover 26 may be on one side of the tear seam 74, and another plurality of ribs 28 extending from the cover 26 may be on an opposite side of the tear seam 74.

The plurality of ribs 30 that extend from the base 22 and the plurality of ribs 28 that extend from the cover 26 are designed to engage each other. For example, e.g., the plurality of ribs 30 that extend from the base 22 may be in an alternating arrangement with the plurality of ribs 28 that extend from the cover 26. To put it another way, the ribs 30 of the plurality of ribs 30 that extend from the base 22 may be disposed between ribs 28 of the plurality of ribs 28 that extend from the cover 26, and vice versa.

The plurality of ribs 30 that extend from the base 22 and the plurality of ribs 28 that extend from the cover 26 may be engaged with each other at initial assembly of the seat 20. For example, when the cover 26 is installed, the cover 26 may be positioned such that the plurality of ribs 30 that extend from the base 22 and the plurality of ribs 28 that extend from the cover 26 engage with each other. To put it another way, during installation the cover 26 may be permitted to slide or roll along the elongated direction of the ribs 28, 30, while at the same time, the ribs 28, 30 may inhibit movement of the cover 26 relative to the base 22 in a direction perpendicular to the elongated direction of the ribs 28, 30.

The plurality of ribs 30 that extend from the base 22 and the plurality of ribs 28 that extend from the cover 26 may engage each other upon inflation of the air bag 24. For example, plurality of ribs 30 and the plurality of ribs 28 may engage each other prior to inflation, as described above, and may remain engaged during inflation of the air bag 24. As another example, prior to inflation of the air bag 24, the cover 26 may be spaced from the chute 32 (not shown) and the cover 26 may move relative to the chute 32 without restriction. Inflation of the air bag 24 may urge the chute 32 toward the cover 26, engaging the plurality of ribs 30 that extend from the chute 32 with the plurality of ribs 28 that extend from the cover 26 and restricting movement of the cover 26 relative to the chute 32.

The plurality of ribs 28 that extend from the cover 26 may be plastic or any other suitable material. The plurality of ribs 28 that extend from the cover 26 and the cover 26 may be monolithic. The plurality of ribs 28 that extend from the cover 26 may be fixed to the inner surface 60 of the cover 26, e.g., with an adhesive, as a laminate, etc.

The plurality of ribs 28 that extend from the cover 26 may extend transversely from the cover 26 and toward the base 22, as shown in FIGS. 5-6. Specifically, the plurality of ribs 28 that extend from the cover 26 may extend from the inner surface 60 of the cover 26.

Figure 5A:
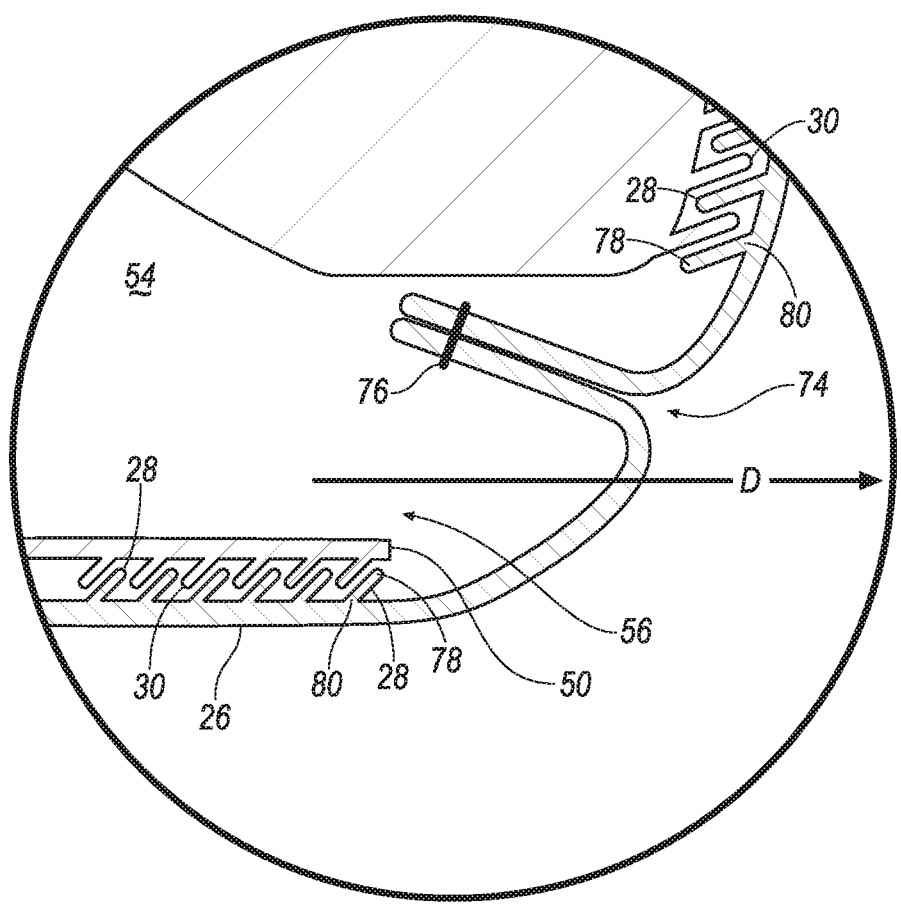
FIG. 5A is an enlargement of a portion of FIG. 5.

The plurality of ribs 28 that extend from the cover 26 may extend toward the open end 56 of the cavity 54. For example, each rib 28 of the plurality of ribs 28 may extend from the cover 26 at a proximate end 80 of such rib 28 to a distal end 78, as shown in FIG. 5A. The distal end 78 may be closer to the open end 56 of the cavity 54 than the proximate end 80 is to the open end 56. The proximate end 80 may be closer to the inner surface 60 of the cover 26 than the distal end 78 is to the inner surface 60.

The plurality of ribs 28 that extend from the cover 26 may extend toward the tear seam 74. For example, the distal end 78 may be closer to the tear seam 74 than the proximate end 80 is to the tear seam 74. The proximate end 80 may be closer to the inner surface 60 of the cover 26 than the distal end 78 is to the inner surface 60.

The plurality of ribs 28 that extend from the cover 26 may extend toward the inflation direction D of the air bag 24. For example, each rib 28 of the plurality of ribs 28 may extend from the proximate end 80 of such rib 28 to the distal end 78 of such rib 28 in the inflation direction D.

The plurality of ribs 30 that extend from base 22 may be plastic or any other suitable material. The plurality of ribs 30 that extend from the base 22 may be monolithic. For example, the chute 32 and the plurality of ribs 30 that extend from the chute 32 may be monolithic. For example, the cushion 34 and the plurality of ribs 30 that extend from the cushion 34 may be monolithic. The plurality of ribs 30 that extend from base 22 may be fixed to the base 22, e.g., to the chute 32, the cushion 34, etc., e.g., with an adhesive, as a laminate, etc.

The plurality of ribs 30 that extend from the base 22 extend transversely from the base 22 and toward the cover 26. For example, the plurality of ribs 30 that extend from the chute 32 may extend transversely from the chute 32, e.g., from the outer surface 58 of the chute 32. For example, the plurality of ribs 30 that extend from the cushion 34 may extend transversely from the cushion 34.

The plurality of ribs 30 that extend from the base 22 may extend in an opposite direction relative to the plurality of ribs 28 that extend from the cover 26. For example, the plurality of ribs 30 that extend from the base 22 may extend away from the open end 56 of the cavity 54, e.g., when the plurality of ribs 28 that extend from the cover 26 extend toward the open end 56 of the cavity 54. For example, the plurality of ribs 30 that extend from the base 22 may extend away from the tear seam 74, e.g., when the plurality of ribs 28 that extend from the cover 26 extend toward the tear seam 74. For example, the plurality of ribs 30 that extend from the base 22 may extend away from the inflation direction D of the air bag 24, e.g., when the plurality of ribs 28 that extend from the cover 26 extend toward the inflation direction D.

With reference to FIG. 1-3, the pluralities of ribs 28, 30 may be elongated parallel to each other. For example, the pluralities of ribs 28, 30 of the seat back 38 may be elongated parallel to each other. For example, the pluralities of ribs 28, 30 of the seat bottom 40 may be elongated parallel to each other. The pluralities of ribs 28,30 may be elongated generally parallel to the tear seam 74.

The pluralities of ribs 28, 30 may be elongated generally perpendicular to the inflation direction D of the air bag 24, as shown in FIGS. 2 and 3. For example, when the pluralities of ribs 28, 30 are on the seat back 38 where the air bag 24 of the seat back 38 inflates in a generally horizontal direction relative to the vertical axis A1, the pluralities of ribs 28, 30 may be elongated along the vertical axis A1, e.g., between the top "T" and the bottom "B" of the seat back 38 as shown in FIG. 2. For example, when the pluralities of ribs 28, 30 are on the seat bottom 40 where the air bag 24 of the seat back 38 inflates in a generally vertical direction relative to the longitudinal axis A2, the pluralities of ribs 28, 30 may be elongated along the longitudinal axis A2, e.g., between the front "F" and the rear "R" of the seat bottom 40, as shown in FIG. 3.

Figure 7:
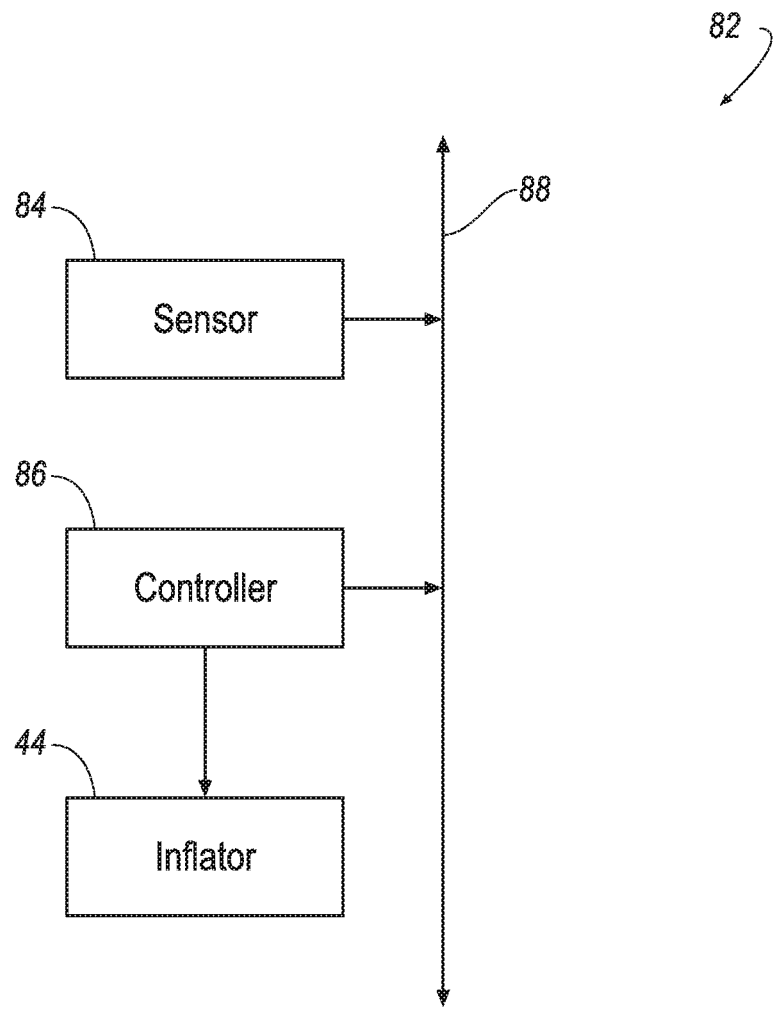
FIG. 7 is a schematic of an impact sensing system.

With reference now to FIG. 7, a vehicle (not shown) may include an impact sensing system 82. The impact sensing system 82 may include at least one sensor 84 for sensing an impact of the vehicle, a controller 86 in communication with the sensor 84, and the inflator 44 in communication with the air bag 24 for inflating the air bag 24 to the inflated position when the sensor 84 senses the impact of the vehicle. Alternatively or additionally to sensing impact, the impact sensing system 82 may be configured to sense impact prior to impact, i.e., pre-impact sensing. The sensor 84 may be of any suitable type, e.g., using radar, lidar, and/or a vision system. The vision system may include one or more cameras, CCD image sensors, and/or CMOS image sensor, etc.

The controller 86 may be a microprocessor-based processor. The controller 86 may include a processor, memory, etc. The memory of the controller 86 may store instructions executable by the processor. The sensor 84 is in communication with the controller 86 to communicate data to the controller 86. Based on the data communicated by the sensor 84, the controller 86 instructs the inflator 44 to activate.

The impact sensing system 82 may transmit signals through a communication network 88 (such as a controller area network (CAN) bus), Ethernet, and/or by any other wired or wireless communication network. The controller 86 may use information from the communication network 88 to control the activation of the inflator 44. The inflator 44 may be connected to the controller 86, as shown in FIG. 7, or may be connected directly to the communication network 88.

In operation, the air bag 24 is in the uninflated position. In the event of an impact, the sensor 84 may detect the impact and transmit a signal through the communication network 88 to the controller 86. The controller 86 may transmit a signal through the communication network 88 to the inflator 44. Upon receiving the signal, the inflator 44 may discharge and inflate the air bag 24. As the air bag 24 inflates, the chute 23 and cushion 34 are urged toward the cover 26, engaging the pluralities of ribs 28, 30 with each other. The air bag 24 creates tension in the cover 26. The pluralities of ribs 28, 30 restrict movement of the cover 26 relative to the chute 23 and cushion 34, concentrating the tension at the tear seam 74. The concentrated tension breaks the stitches 76, opening the tear seam 74, and the air bag 24 deploys outside the seat 20.

The disclosure has been described in an illustrative manner, and it is to be understood that the terminology used is intended to be in the nature of words of description rather than limitation. Many modifications and variations of the present disclosure are possible in light of the above teachings, and the invention may be practiced otherwise than as specifically described.

What is claimed is:

1. A seat assembly, comprising:
a base;
an air bag supported by the base;
a cover adjacent the base;
a first plurality of ribs extending transversely from the cover and toward the base; and
a second plurality of ribs engaged with the first plurality of ribs and extending transversely from the base and toward the cover.

2. The seat assembly of claim 1, wherein the base includes a chute, and the second plurality of ribs extend transversely from the chute.

3. The seat assembly of claim 2, wherein the chute defines a cavity having an open end, and the first plurality of ribs extends from the cover toward the open end and the second plurality of ribs extends from the base away from the open end.

4. The seat assembly of claim 2, wherein the chute and the second plurality of ribs are monolithic.

5. The seat assembly of claim 2, wherein the chute includes an outer surface, and the second plurality of ribs extend transversely from the outer surface.

6. The seat assembly of claim 1, wherein the base includes a cushion, and the second plurality of ribs extend transversely from the cushion.

7. The seat assembly of claim 1, further comprising a seat back defining a vertical axis, and wherein the first plurality of ribs and the second plurality of ribs are elongated along the vertical axis.

8. The seat assembly of claim 1, further comprising a seat bottom defining a longitudinal axis, and wherein the first plurality of ribs and the second plurality of ribs are elongated along the longitudinal axis.

9. The seat assembly of claim 1, wherein the air bag is inflatable in an inflation direction to an inflated position, and wherein the first plurality of ribs and the second plurality of ribs are elongated generally perpendicular to the inflation direction.

10. The seat assembly of claim 1, where the air bag is inflatable in an inflation direction to an inflated position, and wherein the first plurality of ribs extends from the cover toward the inflation direction and the second plurality of ribs extends from the base away from the inflation direction.

11. The seat assembly of claim 1, wherein the cover includes a tear seam, and the first plurality of ribs and the second plurality of ribs are elongated generally parallel to the tear seam.

12. The seat assembly of claim 1, wherein the cover includes a tear seam, and the first plurality of ribs extends from the cover toward the tear seam and the second plurality of ribs extends from the base away from the tear seam.

13. The seat assembly of claim 1, further comprising a third plurality of ribs extending transversely from the cover and toward the base, and wherein the cover includes a tear seam between the first plurality of ribs and the third plurality of ribs.

14. The seat assembly of claim 1, further comprising a third plurality of ribs extending transversely from the cover and toward the base, and a fourth plurality of ribs extending transversely from the base and toward the cover, and wherein the air bag is inflatable to an inflated position that is between the first plurality of ribs and the third plurality of ribs and between the second plurality of ribs and the fourth plurality of ribs.

15. The seat assembly of claim 1, wherein the first plurality of ribs and the second plurality of ribs extend in opposite directions.

16. The seat assembly of claim 1, wherein the cover includes an inner surface, and the first plurality of ribs extends from the inner surface.

17. The seat assembly of claim 1, wherein the first plurality of ribs and the second plurality of ribs are elongated parallel to each other.

18. A seat assembly, comprising:
a base;
an air bag supported by the base;
a cover adjacent the base;
a first plurality of ribs extending transversely from the cover and toward the base;
a second plurality of ribs extending transversely from the base and toward the cover; and
a seat bottom defining a longitudinal axis;
wherein the first plurality of ribs and the second plurality of ribs are elongated along the longitudinal axis.

19. A seat assembly, comprising:
a base;
an air bag supported by the base;
a cover adjacent the base;
a first plurality of ribs extending transversely from the cover and toward the base;
a second plurality of ribs extending transversely from the base and toward the cover; and
a third plurality of ribs extending transversely from the cover and toward the base;
wherein the cover includes a tear seam between the first plurality of ribs and the third plurality of ribs.

* * * * *